(12) United States Patent
Shin et al.

(10) Patent No.: US 9,105,920 B2
(45) Date of Patent: Aug. 11, 2015

(54) COMPOSITE ANODE ACTIVE MATERIAL, ANODE AND LITHIUM BATTERY CONTAINING THE SAME, AND METHOD OF PREPARING THE COMPOSITE ANODE ACTIVE MATERIAL

(71) Applicant: Samsung SDI Co., Ltd., Yongin-si, Gyeonggi-do (KR)

(72) Inventors: Chang-Su Shin, Yongin-si (KR); Jae-Myung Kim, Yongin-si (KR); So-Ra Lee, Yongin-si (KR); Yu-Jeong Cho, Yongin-si (KR); Su-Kyung Lee, Yongin-si (KR); Ui-Song Do, Yongin-si (KR); Sang-Eun Park, Yongin-si (KR); Ha-Na Yoo, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 90 days.

(21) Appl. No.: 13/956,040

(22) Filed: Jul. 31, 2013

(65) Prior Publication Data

US 2014/0147741 A1    May 29, 2014

(30) Foreign Application Priority Data

Nov. 26, 2012  (KR) .......................... 10-2012-0134856

(51) Int. Cl.
| | | |
|---|---|---|
| *H01M 4/583* | (2010.01) | |
| *H01M 4/48* | (2010.01) | |
| *H01M 4/485* | (2010.01) | |
| *H01M 4/36* | (2006.01) | |
| *H01M 4/38* | (2006.01) | |
| *H01M 4/46* | (2006.01) | |

(52) U.S. Cl.
CPC .............. *H01M 4/364* (2013.01); *H01M 4/362* (2013.01); *H01M 4/386* (2013.01); *H01M 4/387* (2013.01); *H01M 4/583* (2013.01); *H01M 4/46* (2013.01); *Y02E 60/122* (2013.01)

(58) Field of Classification Search
None
See application file for complete search history.

(56) References Cited

U.S. PATENT DOCUMENTS

| | | |
|---|---|---|
| 2009/0047579 A1 | 2/2009 | Jang et al. |
| 2010/0021819 A1 | 1/2010 | Zhamu et al. |
| 2010/0143798 A1 | 6/2010 | Zhamu et al. |
| 2010/0147188 A1 | 6/2010 | Mamak et al. |
| 2010/0285359 A1 * | 11/2010 | Hwang et al. ................. 429/219 |
| 2010/0297502 A1 | 11/2010 | Zhu et al. |
| 2011/0183202 A1 | 7/2011 | Lee et al. |
| 2011/0220864 A1 | 9/2011 | Kim et al. |

FOREIGN PATENT DOCUMENTS

| | | |
|---|---|---|
| KR | 10-2010-0054555 A | 5/2010 |
| KR | 10-2011-0088214 A | 8/2011 |

\* cited by examiner

*Primary Examiner* — Cynthia K Walls
(74) *Attorney, Agent, or Firm* — Knobbe Martens Olson & Bear LLP (57) ABSTRACT

In an aspect, a composite anode active material including: a porous particles, said porous particles including: a plurality of composite nanostructures; and a first carbonaceous material binding the composite nanostructures, wherein the porous particles have pores within the particle, and wherein the composite nanostructures include a crystalline second carbonaceous material substrate including at least one carbon nanosheet, and a plurality of metal nanowires arranged at intervals on the crystalline second carbonaceous material substrate is disclosed.

17 Claims, 6 Drawing Sheets

COMPOSITE ANODE ACTIVE MATERIAL, ANODE AND LITHIUM BATTERY CONTAINING THE SAME, AND METHOD OF PREPARING THE COMPOSITE ANODE ACTIVE MATERIAL

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims the benefit of Korean Patent Application No. 10-2012-0134856, filed on Nov. 26, 2012, in the Korean Intellectual Property Office, the disclosure of which is incorporated herein in its entirety by reference.

BACKGROUND

1. Field

One or more embodiments of the present disclosure relate to a composite anode active material, an anode including the composite anode active material, a lithium battery including the anode, and a method of preparing the composite anode active material.

2. Description of the Related Technology

Lithium batteries have high voltage and high energy density, and thus are used in various applications. Lithium batteries for devices such as electric vehicles should be operable at high temperatures, be able to charge or discharge a large amount of electricity, and have long-term usability. Thus, lithium batteries for such devices should have high-discharge capacity and a long lifetime.

Carbonaceous materials are porous and stable with little volumetric change during charging and discharging. However, carbonaceous materials may lead to a low-battery capacity due to the porous structure of carbon. For example, graphite in the form of $LiC_6$ has a theoretical capacity density of about 372 mAh/g. Additionally, carbonaceous materials may have unsatisfactory high-rate characteristics.

Metals that are alloyable with lithium may be used as an anode active material with a higher electrical capacity as compared with carbonaceous materials. Examples of metals that are alloyable with lithium are silicon (Si), tin (Sn), aluminum (Al), and the like. However, these metals have low charge/discharge efficiency, easily deteriorate, and have relatively poor lifetime characteristics. For example, degradation may occur with repeated charging and discharging of metals such as tin. The tin may be in the form of particles where agglomeration and breakage of tin particles may occur, leading to electric shorts.

Therefore, there is a demand for a lithium battery with improved charge/discharge efficiency, discharge capacity and lifetime characteristics.

SUMMARY

One or more embodiments of the present disclosure include a novel composite anode active material.

One or more embodiments of the present disclosure include an anode including the composite anode active material.

One or more embodiments of the present disclosure include a lithium battery employing the anode.

One or more embodiments of the present disclosure include a method of preparing the composite anode active material.

Additional aspects will be set forth in part in the description which follows and, in part, will be apparent from the description, or may be learned by practice of the presented embodiments.

Some embodiments provide a composite anode active material including porous particles said porous particles each including: a plurality of composite nanostructures; and a first carbonaceous material binding the composite nanostructures, wherein the porous particles have pores within the particles, and wherein the composite nanostructures include a crystalline second carbonaceous material substrate including at least one carbon nano-sheet, and a plurality of metal nanowires arranged at intervals on the crystalline second carbonaceous material substrate.

According to one or more embodiments of the present disclosure, an anode includes the above-described composite anode active material.

According to one or more embodiments of the present disclosure, a lithium battery includes the above-described anode.

According to one or more embodiments of the present disclosure, a method of preparing a composite anode active material, the method including: preparing a composite nanostructure; mixing the composite nanostructure, a first carbonaceous material precursor, and a solvent to prepare a mixture slurry; spray-drying the mixture slurry to obtain a dried product; and calcining the dried product to yield the composite anode active material as particles.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of an anode active material, an anode including the anode active material, a lithium battery using the anode, and a method of preparing the anode active material will be described in greater detail.

Some embodiments provide a composite anode active material including porous particles including: a plurality of composite nanostructures; and a first carbonaceous material binding the composite nanostructures, wherein the porous particles have pores within the particles, and wherein the composite nanostructures include a crystalline second carbonaceous material substrate including a carbon nano-sheet, and a plurality of metal nanowires. In some embodiments, the plurality of metal nanowires may be arranged at intervals, on the crystalline second carbonaceous material substrate.

Figure 1A:
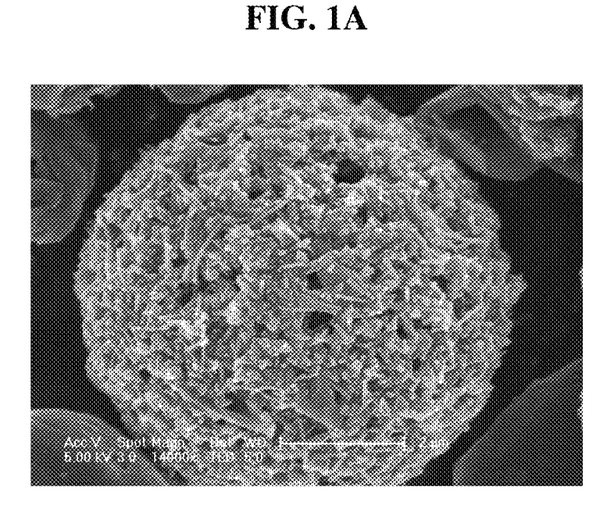
FIG. 1A is a scanning electron microscopic (SEM) image of composite anode active material powder prepared in Example 1.
Figure 1B:
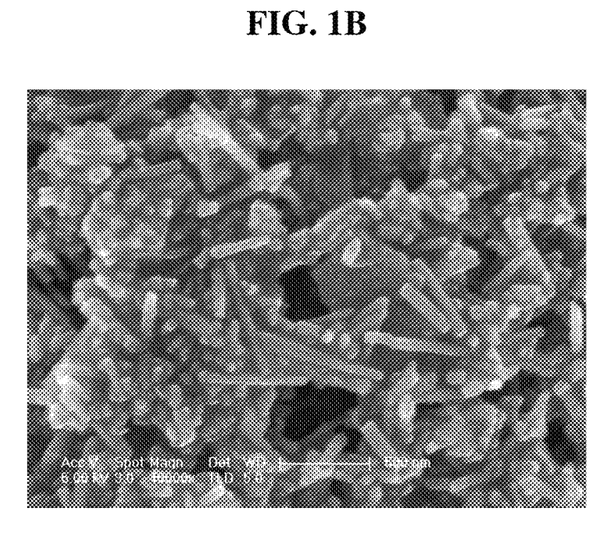
FIG. 1B is a magnified view of FIG. 1A.
Figure 1C:
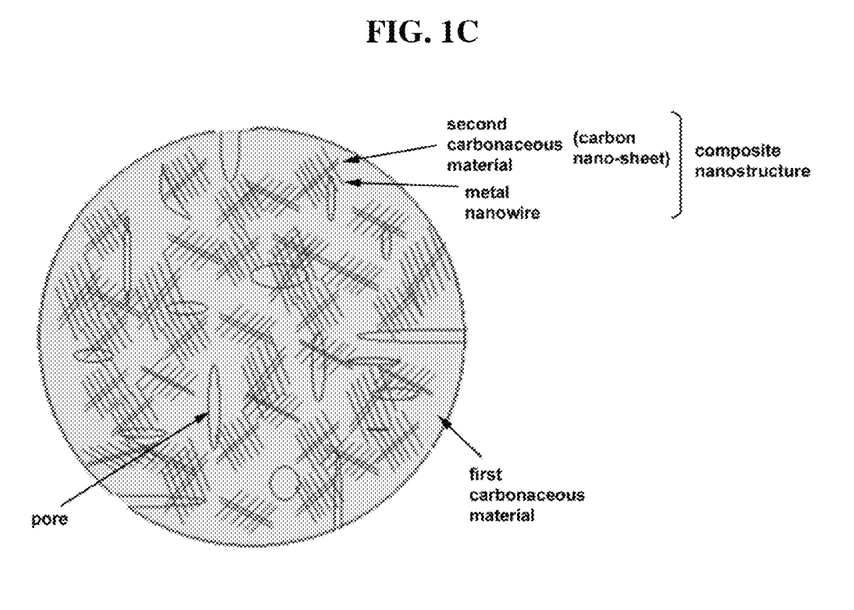
FIG. 1C is an illustration of a composite anode active material particle including labels indicating components of the particle.

FIGS. 1A and 1B show SEM images of the composite anode active material of Example 1. Referring to FIGS. 1A and 1B, the composite anode active material includes pores on a surface thereof. The composite anode active material of Example 1 includes at least one pore having a size of about 50 nm or greater and a plurality of non-spherical pores having a size of several nanometers. FIG. 1C is an illustration of a porous particle of the composite anode active material including labels indicating components of the particle. Referring to FIG. 1C, a porous particle may include a pore, a composite nanostructure and a first carbonaceous material. As shown in FIG. 1C the composite nanostructure may include a second carbonaceous material (e.g. a carbon nano-sheet), and a metal nanowire.

In some embodiments, the composite nanostructures of the composite anode active material may have a structure in which the metal nanowires are bound and integrated with the second carbonaceous material substrate including the carbon nano-sheet. In some embodiments, the carbon nano-sheet may be integrated with the metal nanowires to form one-body composite structures.

In some embodiments, the composite anode active material may have resistance to degradation caused from a volumetric change of metal by having pores inside the particles and by having the composite nanostructures formed of the carbon nano-sheet and the metal nanowires. In some embodiments, the composite anode active material may have improved conductivity due to the carbon nano-sheet being integrated with the metal nanowires. Accordingly, a lithium battery including the composite anode active material may be improved in terms of initial efficiency, discharge capacity, and lifetime characteristics.

In some embodiments, the metal nanowires of the composite nanostructures may be arranged to protrude from a surface of the crystalline second carbonaceous material substrate. In some embodiments, the metal nanowires may extend generally in perpendicular to the carbon nano-sheet. In some embodiments, the metal nanowires may be arranged at an angle of from about 40 degrees to about 135 degrees, and in some embodiments, from about 80 degrees to about 100 degrees, with respect to the carbon nano-sheet. In some embodiments, a lithium battery including the composite anode active material may be improved in terms of discharge capacity, capacity retention rate, and charge/discharge efficiency when the metal nanowires of the composite nanostructures are arranged substantially perpendicular to the carbon nano-sheet. Such arrangement of the metal nanowires may, for example, allow the carbon nano-sheet to have more metal nanowires thereon. Accordingly, the composite anode active material may have increased discharge capacity.

In some embodiments, a metal of the metal nanowires in the composite nanostructures may be at least one selected from the group consisting of silicon, germanium, tin, lead, aluminum, and an alloy thereof. In some embodiments, the metal nanowires may be silicon nanowires, germanium nanowires, or tin nanowires. The alloy for the Group 4 metal may include at least two elements selected from the group consisting of Si, Ge and Sn.

In some embodiments, the metal nanowires in the composite nanostructure may further include a dopant. In some embodiments, the dopant contributes to injecting electrons or holes into the lattice of the metal wires, and thus improves the conductivity of the metal nanowires.

In some embodiments, the dopant for the metal nanowires may be a Group 3B or Group 5B element of the periodic table of elements. Non-limiting examples of the dopant are boron (B), aluminum (Al), gallium (Ga), indium (In), thallium (Tl), phosphorous (P), arsenic (As), antimony (Sb), and bismuth (Bi). In some embodiments, the Group 3B element may be a p-type dopant, and the Group 5B element may be an n-type dopant. In some embodiments, the addition of the dopant may improve the reversibility of reactions in the electrode.

In some embodiments, the metal nanowires of the composite anode active materials may have a diameter of from about 5 nm to about 200 nm, and in some embodiments, a diameter of from about 5 nm to about 100 nm, and in some other embodiments, a diameter of from about 5 nm to about 80 nm, and in still other embodiments, a diameter of from about 30 nm to about 80 nm. When the diameter of the metal nanowires is within these ranges, a lithium battery including the composite anode active material may have improvements in discharge capacity, capacity retention rate, and charge/discharge efficiency.

In some embodiments, at least one of the metal nanowires in the composite anode active material may have a length of from about 50 nm to about 50 μm, and in some embodiments, a length of from about 50 nm to about 10 μm, and in some other embodiments, a length of from about 50 nm to about 5 μm. When the length of the metal nanowires is within these ranges, a lithium battery including the composite anode active material may be improved in terms of discharge capacity, capacity retention rate, and charge/discharge efficiency.

In some embodiments, the metal nanowires of the composite anode active material may be arranged on the substrate to have a gap of about 500 nm or less, and in some embodiments, a gap of from about 200 nm to about 500 nm.

In some embodiments, the composite anode active material may include a plurality of pores within the particles.

In some embodiments, the pores within the particle may have a pore size of about 50 nm or greater. In some embodiments, the pores of a size of about 50 nm or greater of the composite anode active material may absorb a volumetric change in the metal nanowires during charging/discharging, and may improve conductivity of the crystalline second carbonaceous material. As used herein, the pore size refers to a linear distance between two spots farthest away from each other on pore circumference. In some embodiments, the porous particles may have a pore size of from about 50 nm to about 500 nm, and in some embodiments, a pore size of from about 50 nm to about 200 nm.

In some embodiments, the porous particle may have microsized pores of, for example, about 1 μm or greater within the particle. In some embodiments, the porous particles may have a pore size of from about 1 μm to about 15 μm. In some embodiments, the porous particles may have a pore size of from about 2 µm to about 15 µm. In some embodiments, the porous particles may have a pore size of from about 3 µm to about 15 µm. In some embodiments, the porous particles may have a pore size of from about 5 µm to about 15 µm.

In some embodiments, the porous particle may include pores in irregular shapes inside the particles. In some embodiments, the porous particles may include spherical pores, or pores in any of a variety of shapes.

In some embodiments, the porous particles may include pores having a non-spherical cross-section. For example, a non-spherical pore may have an aspect ratio of 3 or greater.

In some embodiments, at least part of the non-spherical pore may be defined by the second carbonaceous material substrate. In some embodiments, a non-spherical pore may be between two crystalline second carbonaceous material substrates formed as carbon nano-sheets to have walls defined by the two crystalline second carbonaceous material substrates. In some embodiments, the wall of the non-aspheric pore may be defined by the crystalline second carbonaceous material substrate with the metal nanowires arranged thereon with a first carbonaceous material coated thereon.

In some embodiments, the porous particles in the composite anode active material may have pores on particle surface.

In some embodiments, at least part of a pore on the particle surface may be defined by the crystalline second carbonaceous material substrate. For example, as illustrated in FIG. 1B, a plurality of crystalline second carbonaceous material substrates formed as carbon nano-sheets may be overlapped with one another forming pores therebetween exposed to the particle surface.

In some embodiments, the particles of the composite anode active material may have a tap density of about 1 g/cm$^3$ or less, and in some embodiments, a tap density of about 0.4 g/cm$^3$ to about 0.6 g/cm$^3$. When the particles of the composite anode active material have too small tap density, the particles may have a weak strength and thus may likely to be broken when an electrode is pressed.

In some embodiments, the particle of the composite anode active material may have a Brunauer-Emmett-Teller (BET) specific surface area of about 100 m$^2$/g or greater, and in some embodiments, a BET specific surface area of from about 100 m$^2$/g to about 650 m$^2$/g, and in some other embodiments, a BET specific surface area of from about 100 m$^2$/g to about 600 m$^2$/g. When the BET specific surface area of the particle is too small, a binder may be used in excess.

In some embodiments, the particles of the composite anode active material may have a pore volume of about 0.3 cm$^3$/g or greater. In some embodiments, the particles of the composite anode active material may have a pore volume of about from 0.3 cm$^3$/g to about 0.6 cm$^3$/g. In some embodiments, the particles of the composite anode active material may have a pore volume of about from 0.4 cm$^3$/g to about 0.6 cm$^3$/g.

In some embodiments, the particles of the composite anode active material may have an average particle diameter (D50) of about 5 µm or greater. In some embodiments, the particles of the composite anode active material may have an average particle diameter (D50) of from about 5 µm to about 30 µm. In some embodiments, the particles of the composite anode active material may have an average particle diameter (D50) of from about 5 µm to about 14 µm. When the average particle diameter is too small, it may be difficult to prepare an anode active material slurry and to coat an electrode plate with the slurry. When the average particle diameter is too large, a coating layer of the anode active material slurry may be uneven, and high-rate characteristics of resulting anode may be deteriorated.

In some embodiments, the particles of the composite anode active material may include spherical particles having an aspect ratio of 3 or less, or elliptical particles. In some embodiments, the particles may include spherical particles having an aspect ratio of less than 2. In some embodiments, the particles may include spherical particles having an aspect ratio of from about 2 to about 1. In some embodiments, the particles may include spherical particles having an aspect ratio of from about 1.5 to about 1. When the particles have a spherical shape, dispersion of the slurry may be facilitate, and an electrode plate manufactured therefrom may be strong plate intensity.

In some embodiments, the composite nanostructures of the composite anode active material may be dispersed within the particle of the composite anode active material. In some embodiments, the particle of the composite anode active material may include non-spherical pores when the composite nanostructures are dispersed in first carbonaceous material while being bound with the first carbonaceous material.

In some embodiments, an amount of the composite nanostructures in the composite anode active material may be from greater than 0 wt % to equal to and greater than 85 wt %. In some embodiments, an amount of the composite nano-structures in the composite anode active material may be from about 20 wt % to about 85 wt %. In some embodiments, an amount of the composite nano-structures in the composite anode active material may be from about 40 wt % to about 85 wt %. In some embodiments, an amount of the composite nano-structures in the composite anode active material may be from about 50 wt % to about 85 wt %. In some embodiments, an amount of the composite nano-structures in the composite anode active material may be from about 60 wt % to about 85 wt %, based on a total weight of the particles. When the amount of the composite nano-structures is too high, the particle shape may be deformed due to volumetric expansion of the particles.

Figure 6:
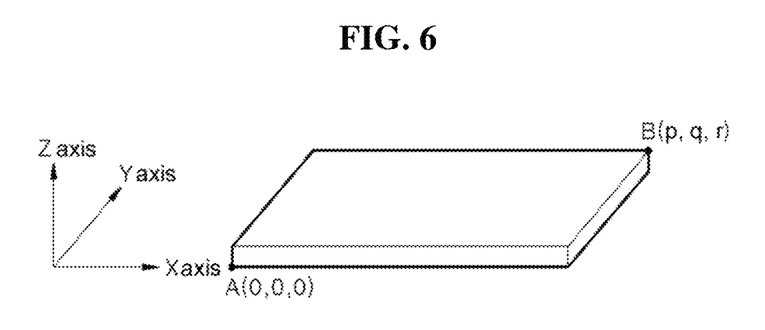
FIG. 6 is a simplified schematic view of the crystalline second carbonaceous material according to an embodiment of the present invention.

In some embodiments, referring to FIG. 6, the crystalline second carbonaceous material of the composite anode active material has a structure in which n polycyclic carbon nano-sheets are stacked upon one another perpendicular with respect to a first plane, wherein each of the polycyclic carbon nano-sheets includes six-member carbocyclic rings of six carbon atoms linked to each other, the six-member carbocyclic rings being fused to one another and arranged on the first plane. With the assumption that first and second carbons are selected from the n polycyclic nano-sheets in such a way that L1≥L2 and are positioned in a 3D coordinate system with x, y and z axes in such a way that the second carbon is located at B(p, q, r) with respect to the first carbon located at the origin A(0, 0, 0), p and q may be each independently 10 µm or less, and r may be 100 nm or less, wherein L1 denotes a distance between the first carbon and the second carbon, and L2 denotes a distance between a third carbon and a fourth carbon arbitrarily selected from the n polycyclic nano-sheets, the third and fourth carbons being neither identical to each other nor to the first and second carbons.

In some embodiments, the crystalline second carbonaceous material substrate may have an irregular shape, for example, a "planar" shape. The shape of the crystalline second carbonaceous material substrate is not limited to a planar shape, and may have any of a variety of shapes, for example, it may be bent or have a rolled end. It may be understood from an image of FIG. 2A that the crystalline second carbonaceous material substrate may generally have a planar shape.

As used herein, the term "carbocyclic rings having six carbon atoms" denotes rings including carbon atoms at respective apexes of a hexagon. Hereinafter, this term may be referred to as a "six-member carbocyclic ring". Each of the polycyclic carbon nano-sheets includes a plurality of six-member carbocyclic rings fused to one another in a single layer in which the six-member carbocyclic rings are arranged on the first plane in an atomic-scale honeycomb lattice made of carbon atoms. In this regard, "the arrangement of six-member carbocyclic rings on the (a) first plane" indicates the arrangement and extension of the six-member carbocyclic rings in a lateral direction by fusing, and does not indicate the arrangement and extension thereof in a longitudinal direction.

Adjacent carbon atoms in the polycyclic carbon nano-sheets are linked via an sp2 bond. Thus, a delocalized resonance structure is formed in the six-member carbocyclic rings.

In some embodiments, the polycyclic carbon nano-sheets may have a structure in which a plurality of six-member carbocyclic rings are fused to each other and arranged on the first plane. Thus, each of the polycyclic carbon nano-sheets may have, for example, a thickness within a range of the atomic diameter of carbon plus or minus one nanometer ($\pm 1$ nm). In this regard, the thickness of a polycyclic carbon nano-sheet in the range of the atomic diameter of carbon "plus or minus 1 nm ($\pm 1$ nm)" means that the polycyclic carbon nano-sheet may be bent, have a rolled end, or be partially broken.

As described above, the crystalline second carbonaceous material substrate may have a structure in which n polycyclic carbon nano-sheets are stacked upon one another. In some embodiments, the n polycyclic nano-sheets are stacked upon one another perpendicularly with respect to the first plane on which the plurality of six-member carbocyclic rings fused to each other are arranged.

In some embodiments, n may be an integer from 2 to 100. In some embodiments, n may be an integer from 2 to 80. In some embodiments, n may be an integer from 2 to 70. In some embodiments, n may be an integer from 2 to 40. In some embodiments, n may be an integer from 2 to 20. In some embodiments, n may be an integer from 2 to 10.

In the crystalline second carbonaceous material, referring to FIG. 6, the first and second carbons are selected from the n polycyclic nano-sheets in such a way that L1≥L2; and in a 3D x, y and z coordinate system, the second carbon is located at B(p, q, r) with respect to the first carbon located at the origin A(0, 0, 0), wherein p and q may be each independently about 10 μm or less, and r may be about 100 nm or less. Assuming that L1 denotes a distance between a first carbon and a second carbon and L2 denotes a distance between a third carbon and a fourth carbon arbitrarily selected from the n polycyclic nano-sheets so that the third and fourth carbons are neither identical to each other nor the same as the first and second carbons. The first and second carbons are two carbons with the largest distance therebetween from among all carbons in the n polycyclic nano-sheets.

In some embodiments, p and q may be each independently 10 μm or less. In some embodiments, p and q may be each independently from about 0.1 μm to about 10 μm. In some embodiments, p and q may be each independently from about 1 μm to about 10 μm. In some embodiments, p and q may be each independently from about 6 μm to about 10 μm. For example, p and q may be width and length in the height direction, respectively, in a direction perpendicular to the thickness direction of the crystalline second carbonaceous material.

In some embodiments, the r may be about 100 nm or less. In some embodiments, r may be from about 0.5 nm to about 100 nm. In some embodiments, r may be from about 0.5 nm to about 90 nm. In some embodiments, r may be from about 0.5 nm to about 50 nm. In some embodiments, r may be from about 0.5 nm to about 20 nm. For example, r may be a length in the thickness direction of the crystalline second carbonaceous material. In some embodiments, the crystalline second carbonaceous material may have a planar shape.

When p, q and r of the crystalline second carbonaceous material are within the ranges above, although the present embodiments are not limited to any particular principle, the transfer of electrons in the crystalline second carbonaceous material may be facilitated, and thus, the crystalline second carbonaceous material may have improved conductivity.

In some embodiments of the composite anode active material, a crystal lattice distance ($d_{002}$) of the second carbonaceous material substrate may be from about 0.330 nm to about 0.400 nm. In some embodiments of the composite anode active material, a crystal lattice distance ($d_{002}$) of the second carbonaceous material substrate may be from about 0.350 nm to about 0.400 nm. In some embodiments of the composite anode active material, a crystal lattice distance ($d_{002}$) of the second carbonaceous material substrate may be from about 0.350 nm to about 0.380 nm.

In some embodiments, the first carbonaceous material of the composite anode active material may include amorphous carbon. For example, the first carbonaceous material may be a calcined product of a carbon precursor. The carbon precursor may be any carbonaceous material available in the art that is obtained through calcination.

For example, the carbon precursor may be at least one selected from the group consisting of polymer, coal tar pitch, petroleum pitch, meso-phase pitch, corks, low-molecular weight intermediate crude oil, coal-based pitch, and a derivative thereof.

In some embodiments, the composite anode active material may further a carbonaceous coating layer on the particles. In some embodiments, the carbonaceous coating layer may include amorphous carbon. When the carbonaceous coating layer is formed on a core of the anode active material, it may form a solid electrolyte interphase (SEI) preventing direct contact of the second carbonaceous material with an electrolyte while allowing Li$^+$ ions to selectively pass through.

Some embodiments provide an anode includes the above-described composite anode active material. In some embodiments, the anode may be manufactured by molding an anode active material composition including the composite anode active material and a binder into a desired shape, by coating the anode active material composition on a current collector such as a copper foil, or the like.

In some embodiments, the composite anode active material, a conducting agent, a binder, and a solvent are mixed to prepare the anode active material composition. In some embodiments, the anode active material composition may be directly coated on a metallic current collector to prepare an anode plate. In some embodiments, the anode active material composition may be cast on a separate support to form an anode active material film, which may then be separated from the support and laminated on a metallic current collector to prepare a negative plate. The anode is not limited to the examples described above, and may be one of a variety of types.

Non-limiting examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used. The above-described crystalline carbonaceous materials may be added as the conducting agent.

Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Examples of the solvent are N-methyl-pyrrolidone, acetone, and water, but are not limited thereto. Any material available as a solvent in the art may be used.

The amounts of the composite anode active material, the conducting agent, the binder, and the solvent are those levels that are generally used in manufacturing a lithium battery. In some embodiments, at least one of the conducting agent, the binder and the solvent may not be used according to the use and the structure of the lithium battery.

Some embodiments provide a lithium battery includes an anode including the anode active material. In some embodiments, the lithium battery may be manufactured in the following manner.

First, an anode is prepared according to the above-described anode manufacturing method.

Next, a cathode active material, a conducting agent, a binder, and a solvent are mixed to prepare a cathode active material composition. In some embodiments, the cathode active material composition may be directly coated on a metallic current collector and dried to prepare a cathode plate. In some embodiments, the cathode active material composition may be cast on a separate support to form a cathode active material film, which may then be separated from the support and laminated on a metallic current collector to prepare a cathode plate.

In some embodiments, the cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

In some embodiments, the cathode active material may be a compound selected from the group consisting of $Li_aA_{1-b}B^1{}_bD^1{}_2$ where $0.90 \le a \le 1.8$ and $0 \le b \le 0.5$;
$Li_aE_{1-b}B^1{}_bO_{2-c}D^1{}_c$ where $0.90 \le a \le 1.8$, $0 \le b \le 0.5$, and $0 \le c \le 0.05$;
$LiE_{2-b}B^1{}_bO_{4-c}D^1{}_c$ where $0 \le b \le 0.5$ and $0 \le c \le 0.05$;
$Li_aNi_{1-b-c}Co_bB^1{}_cD^1{}_\alpha$ where $0.90 \le a \le 1.8$, $0 \le b \le 0.5$, $0 \le c \le 0.05$, and $0 < \alpha \le 2$;
$Li_aNi_{1-b-c}Co_bB^1{}_cO_{2-\alpha}F^1{}_\alpha$ where $0.90 \le a \le 1.8$, $0 \le b \le 0.5$, $0 \le c \le 0.05$, and $0 < \alpha < 2$;
$Li_aNi_{1-b-c}Co_bB^1{}_cO_{2-\alpha}F^1{}_2$ where $0.90 \le a \le 1.8$, $0 \le b \le 0.5$, $0 \le c \le 0.05$, and $0 < \alpha < 2$;
$Li_aNi_{1-b-c}Mn_bB^1{}_cD^1{}_\alpha$ where $0.90 \le a \le 1.8$, $0 \le b \le 0.5$, $0 \le c \le 0.05$, and $0 < \alpha \le 2$;
$Li_aNi_{1-b-c}Mn_bB^1{}_cO_{2-\alpha}F^1{}_\alpha$ where $0.90 \le a \le 1.8$, $0 \le b \le 0.5$, $0 \le c \le 0.05$, and $0 < \alpha < 2$;
$Li_aNi_{1-b-c}Mn_bB^1{}_cO_{2-\alpha}F^1{}_2$ where $0.90 \le a \le 1.8$, $0 \le b \le 0.5$, $0 \le c \le 0.05$, and $0 < \alpha < 2$;
$Li_aNi_bE_cG_dO_2$ where $0.90 \le a \le 1.8$, $0 \le b \le 0.9$, $0 \le c \le 0.5$, and $0.001 \le d \le 0.1$;
$Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$;
$Li_aNiG_bO_2$ where $0.90 \le a \le 1.8$ and $0.001 \le b \le 0.1$;
$Li_aCoG_bO_2$ where $0.90 \le a \le 1.8$ and $0.001 \le b \le 0.1$;
$Li_aMnG_bO_2$ where $0.90 \le a \le 1.8$ and $0.001 \le b \le 0.1$;
$Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$;
$LiI^1O_2$; $LiNiVO_4$; $Li_{(3-f)}J_2(PO_4)_3$ $(0 \le f \le 2)$; $Li_{(3-f)}Fe_2(PO_4)_3$ $(0 \le f \le 2)$; and $LiFePO_4$.

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G may be selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; $I^1$ may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

In some embodiments, the compounds listed above as cathode active materials may have a surface coating layer (hereinafter, "coating layer"). In some embodiments, a mixture of a compound without having a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that does not adversely affect the physical properties of the cathode active material when a compound of the coating element is used. For example, the coating layer may be formed using a spray coating method, a dipping method, or the like.

In some embodiments, the cathode active material may be formed of, for example, $LiNiO_2$, $LiCoO_2$, $LiMn_xO_{2x}$ (x=1, 2), $LiNi_{1-x}Mn_xO_2$ $(0 < x < 1)$, $LiNi_{1-x-y}Co_xMn_yO_2$ $(0 \le x \le 0.5, 0 \le y \le 0.5)$, $LiFeO_2$, $V_2O_5$, TiS, or MoS.

In some embodiments, the conducting agent, the binder and the solvent used for the cathode active material composition may be the same as those used for the anode active material composition. In some embodiments, a plasticizer may be further added into the cathode active material composition and/or the anode active material composition to form pores in the electrode plates.

The amounts of the cathode electrode active material, the conducting agent, the binder, and the solvent are those levels that are generally used to the manufacture of a lithium battery. In some embodiments, at least one of the conducting agent, the binder and the solvent may not be included according to the use and the structure of the lithium battery.

Next, a separator to be disposed between the cathode and the anode may be prepared. The separator may be any separator that is commonly used for lithium batteries. In some embodiments, the separator may have low resistance to migration of ions in an electrolyte and have an excellent electrolyte-retaining ability. Examples of the separator include glass fiber, polyester, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

In some embodiments, a polymer resin, a filler, and a solvent may be mixed together to prepare a separator composition. In some embodiments, the separator composition may be directly coated on an electrode, and then dried to form the separator. In some embodiments, the separator composition may be cast on a support and then dried to form a separator film, which may then be separated from the support and laminated on an electrode to form the separator.

In some embodiments, the polymer resin used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and a mixture thereof.

Next, an electrolyte is prepared.

For example, the electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. In some embodiments, the solid electrolyte may be formed on the anode by, for example, sputtering.

In some embodiments, an organic electrolyte solution may be prepared by dissolving a lithium salt in an organic solvent.

The organic solvent may be any solvent available as an organic solvent in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, or a mixture thereof.

Figure 5:
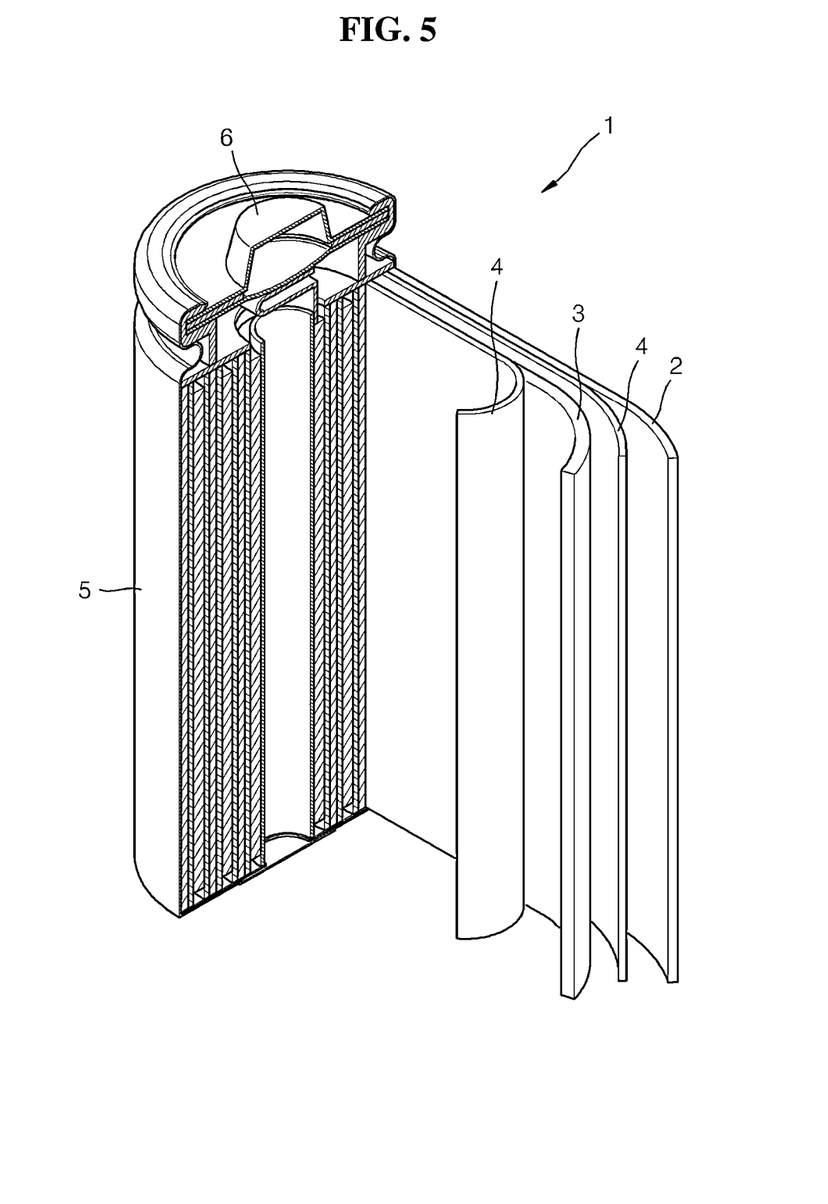
FIG. 5 is a schematic view of a lithium battery according to an embodiment of the present invention.

Referring to FIG. 5, a lithium battery 1 includes a cathode 3, an anode 2, and a separator 4. In some embodiments, the cathode 3, the anode 2 and the separator 4 may be wound or folded, and then sealed in a battery case 5. In some embodiments, the battery case 5 may be filled with an organic electrolyte solution and sealed with a cap assembly 6, thereby completing the manufacture of the lithium battery 1. In some embodiments, the battery case 5 may be a cylindrical type, a rectangular type, or a thin-film type. For example, the lithium battery may be a thin-film type battery. In some embodiments, the lithium battery may be a lithium ion battery.

In some embodiments, the separator may be interposed between the cathode and the anode to form a battery assembly. In some embodiments, the battery assembly may be stacked in a bi-cell structure and impregnated with the electrolyte solution. The resultant is put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output, for example, in a laptop computer, a smart phone, electric vehicle, and the like.

In some embodiments, the lithium battery may have improved high rate characteristics and lifetime characteristics, and thus may be applicable in an electric vehicle (EV), for example, in a hybrid vehicle such as plug-in hybrid electric vehicle (PHEV).

Some embodiments provide a method of preparing a composite anode active material includes: preparing a composite nanostructure; mixing the composite nanostructure, a first carbonaceous material precursor, and a solvent to prepare a mixture slurry; spray-drying the mixture slurry to obtain a dried product; and calcining the dried product to yield the composite anode active material as particles.

In some embodiments of the preparation method, the first carbonaceous material precursor may include at least one selected from the group consisting of polymer, coal tar pitch, petroleum pitch, meso-phase pitch, corks, low-molecular-weight intermediate crude oil, coal-based pitch, and a derivative thereof.

The solvent used in the method is not specifically limited. Any solvent evaporating at a temperature of 50° C. or higher may be used. Non-limiting examples of the solvent are N-methylpyrrolidone (NMP), acetone, and tetrahydrofuran (THF).

In some embodiments of the preparation method, the mixture slurry may have a solid content of less than 45 wt %. In some embodiments, the solid content of the mixture slurry may be less than 40 wt %. In some embodiments, the solid content of the mixture slurry may be less than 35 wt %. In some embodiments, the solid content of the mixture slurry may be less than 30 wt %. In some embodiments, the solid content of the mixture slurry may be less than 25 wt %. In some embodiments, the solid content of the mixture slurry may be less than 20 wt %. In some embodiments, the solid content of the mixture slurry may be less than 10 wt %. When the solid content of the mixture slurry is too high, the mixture slurry may not form a uniform dispersion.

In some embodiments of the preparation method, the spray-drying may be performed at a temperature of from about 50° C. to about 200° C. In some embodiments, the spray-drying may be performed at a temperature of from about 50° C. to about 150° C. In some embodiments, the spray-drying may be performed at a temperature of from about 80° C. to about 150° C. In some embodiments, the spray-drying may be performed at a temperature of from about 100° C. to about 140° C. When the spray-drying temperature is below 50° C., the drying may be insufficient, resulting in incompletely dried powder in irregular shapes. When the spray-drying temperature is above 200° C., the resulting powder may be overdried and have weak strength. The spray-drying temperature is a temperature inside the chamber where the mixture slurry is sprayed. In some embodiments, a gas to be supplied into the chamber may have a temperature of about 200° C. or higher. In some embodiments, the spray-drying may incorporate more pores in the composite anode active material particles.

In some embodiments, the calcining may be performed at a temperature of from about 800° C. to about 1000° C. in an inert atmosphere for about 0.1 to about 10 hours, but is not limited to the conditions. For example, the calcining may be performed under any condition in which the first carbonaceous material may be generated from the first carbonaceous material precursor through calcination.

In some embodiments of the method, the preparing of the composite nanostructure may include preparing a crystalline carbonaceous material including a carbon nano-sheet; and growing metal nanowires on a surface of the crystalline carbonaceous material.

In some embodiments, the crystalline carbonaceous material including a carbon nano-sheet may be prepared by thermally treating expandable graphite at a temperature of from about 300° C. to about 700° C. for about 0.1 to about 5 hours. In some embodiments, the thermal treatment temperature may be from about 400° C. to about 600° C. In some embodiments, the thermal treatment temperature may be from about 450° C. to about 550° C. In some embodiments, the thermal treatment time may be from about 0.5 to about 3 hours. In some embodiments, the thermal treatment time may be from about 0.5 to about 2 hours.

In some embodiments, the porous particles may have expandable graphite may be obtained by dipping natural graphite, artificial graphite, carbon fiber, spherical graphite, or the like, in a strong acid solution, such as a sulfuric acid or a hydrochloric acid, for about 1 to 24 hours, but not limited thereto. For example, the expandable graphite may be prepared using any of a variety of methods.

In some embodiments, the growing of the metal nanowires on the surface of the crystalline carbonaceous material may include forming a catalyst on a surface of the crystalline carbonaceous material, and growing the metal nanowires from the catalyst, but not limited thereto. Any method of growing metal nanowires on a carbonaceous conductive substrate may be used. Non-limiting example of the catalyst are platinum, gold, cobalt, copper, and nickel.

One or more embodiments will now be described in more detail with reference to the following examples. However, these examples are for illustrative purposes only and are not intended to limit the scope of the one or more embodiments.

EXAMPLES

Preparation of Second Carbonaceous Material-Based Substrate

Preparation Example 1

100 g of expandable graphite was heated at 500° C. for 1 hour to expand, and a gas generated during the heating was exhausted through a ventilation hole to obtain an expanded graphite product. The expanded graphite product was dispersed in ethanol and ground using a homogenizer at 10,000 rpm for 10 minutes to obtain a mixture, which was then further ground using a micro fluidizer, filtered through a filtering device, washed with ethanol, and then dried in a 120° C. oven to obtain a crystalline carbonaceous material powder (crystalline second carbonaceous material of Preparation Example 1).

Figure 2A:
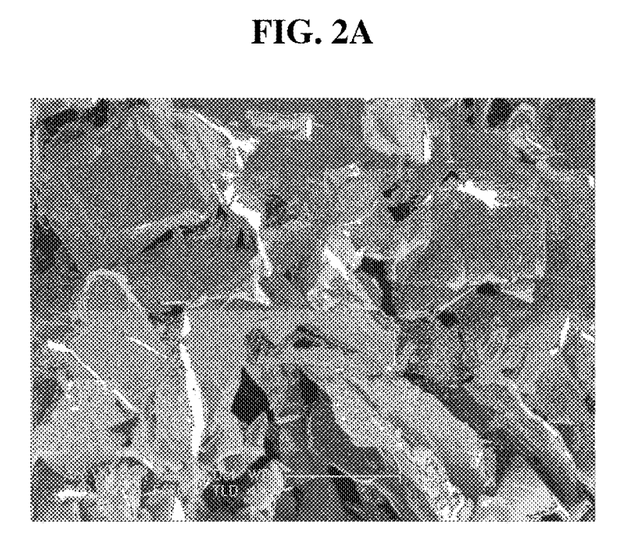
FIG. 2A is a SEM image of a crystalline first carbonaceous material prepared in Preparation Example 1.

The crystalline carbonaceous material powder was analyzed using scanning electron microscopy (SEM). A SEM image of the crystalline carbonaceous material powder is shown in FIG. 2A. Referring to FIG. 2A, individual nanoparticles in the crystalline carbonaceous material powder were found to have "planar" shape.

Figure 2B:
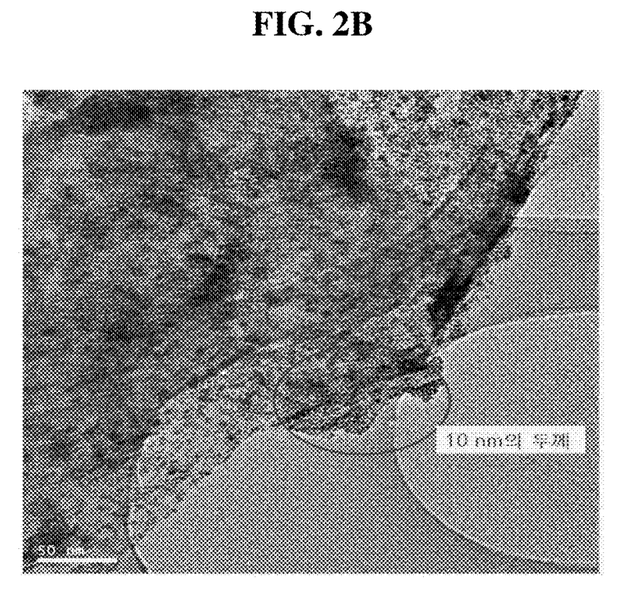
FIG. 2B is a transmission electron microscopic (TEM) image of the crystalline first carbonaceous material of Preparation Example 1.

The nanoparticles in the crystalline carbonaceous material powder were observed by the transmission electron microscopy (TEM). A TEM image thereof is shown in FIG. 2B. Referring to FIG. 2B, a region delimited by a circle corresponds to a cross-section of the planar nanoparticle of the crystalline carbonaceous material powder, which was found to have a thickness of about 10 nm, which support that the crystalline carbonaceous material nanoparticles prepared as described above have an r of about 10 nm ("r" is as defined according to the discussion of FIG. 6).

Preparation of Composite Nanostructure

Preparation Example 2

Si nanowires (SiNW) were grown on the crystalline second carbonaceous material of Preparation Example 1 by a vapor-liquid-solid (VLS) growth method. After applying an Ag catalyst on a surface of the planar carbonaceous material, $SiH_4$ gas was flowed at a temperature of about 500° C. or greater to grow Si nanowires thereon, thereby preparing a composite nanostructure.

The grown Si nanowires had an average diameter of about 50 nm and an average length of about 2 μm.

Figure 3:
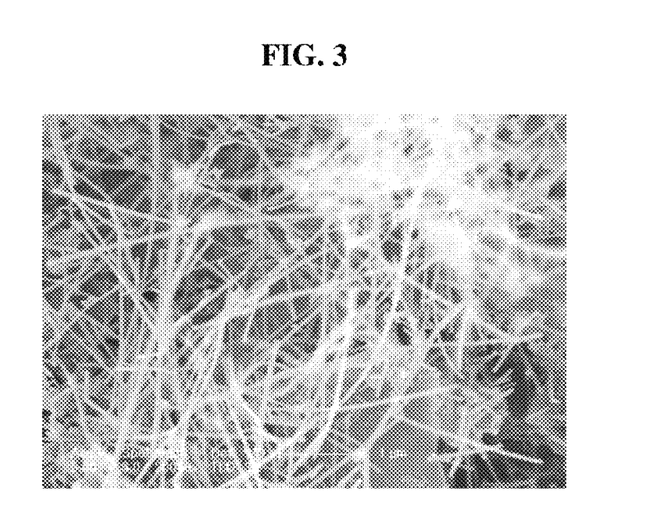
FIG. 3 is a SEM image of metal nanowires prepared in Preparation Example 2.

A SEM image of the prepared metal nanostructure is shown in FIG. 3.

Preparation Example 3

A composite nanostructure was prepared in the same manner as in Preparation Example 2, except that an average length of the Si nanowires was about 5 μm.

Preparation Example 4

A composite nanostructure was prepared in the same manner as in Preparation Example 2, except that an average diameter of the Si nanowires was about 100 nm.

Preparation of Composite Anode Active Material

Example 1

About 50 parts by weight of the composite nanostructure of Preparation Example 2, and about 20 parts by weight of meso-phase pitch (72% of residual carbon) were added to 30 parts by weight of N-methylpyrrolidone solvent, and the resultant mixture was stirred using a homogenizer three times for about 10 minutes each to prepare a slurry. Thereafter, the slurry was supplied to a chamber in a spray at a rate of 5 g/sec, the temperature of the chamber set to about 120° C. to obtain a spray-dried powder. The spray-dried powder was calcined at about 800° C. for 1 hour in a nitrogen atmosphere to afford a composite anode active material powder.

SEM images of the composite anode active material powder of Example 1 are shown in FIGS. 1A and 1B. Referring to FIGS. 1A and 1B, the composite anode active material includes pores on a surface thereof. The composite anode active material includes a pore having a size of about 50 nm or greater and a plurality of non-spherical pores having a size of several nanometers therein.

The composite anode active material has an aspect ratio of about 1 to about 1.5, and an average particle diameter (D50) of about 12 μm.

Example 2

A composite anode active material was prepared in the same manner as in Example 1, except that the composite nanostructure particles of Preparation Example 3 were used.

Example 3

A composite anode active material was prepared in the same manner as in Example 1, except that the composite nanostructure particles of Preparation Example 4 were used.

Comparative Example 1

About 40 parts by weight of the crystalline second carbonaceous material nanoparticles of Preparation Example 1, 10 parts by weight of Si nanowires having an average diameter of about 50 nm, and about 20 parts by weight of meso-phase pitch (72% of residual carbon) were added to 30 parts by weight of N-methylpyrrolidone solvent, and the resultant mixture was stirred using a homogenizer three times for about 10 minutes each to prepare a slurry. Thereafter, the slurry was supplied to a chamber in a spray at a rate of 5 g/sec, the temperature of the chamber set to about 120° C. to obtain a spray-dried powder.

The spray-dried powder was calcined at about 800° C. for 1 hour in a nitrogen atmosphere to prepare composite anode active material powder.

The composite anode active material of Comparative Example 1 had an average particle diameter (D50) of about 15 μm.

Comparative Example 2

About 40 parts by weight of the crystalline second carbonaceous material nanoparticles of Preparation Example 1, 10 parts by weight of Si nanoparticles having an average particle diameter of about 300 nm, and about 20 parts by weight of meso-phase pitch (72% of residual carbon) were added to 30 parts by weight of N-methylpyrrolidone solvent, and the resultant mixture was stirred using a homogenizer three times for about 10 minutes each to prepare a slurry. Thereafter, the slurry was mechanically milled using a beads-mill, and then calcined at about 900° C. for about 1 hour to obtain a calcined product. The calcined product was ground to afford the composite anode active material powder.

Manufacture of Positive Electrode and Lithium Battery

Example 4

The composite anode active material powder synthesized in Example 1, and a polyvinylidene fluoride (PVdF) binder were mixed in an N-methylpyrrolidone solvent to prepare a slurry including the active material and the binder in a weight ratio of 94:6.

The slurry was coated on a 10 μm-thick copper (Cu) foil, dried at about 135° C. for about 3 hours, and then roll-pressed to a thickness of about 70 μm to form a negative plate, which was then used to form a coin cell (CR2016), having a diameter of about 32 nm.

In manufacturing the coin cell, metal lithium as a counter electrode, a polyethylene separator (Star 20, Asahi Kasei, Japan) having a thickness of about 20 μm, and an electrolyte solution of 1.15M $LiPF_6$ dissolved in a mixed solvent of ethylenecarbonate (EC), ethylmethylcarbonate (EMC), and diethylcarbonate (DEC) in a 3:3:4 volume ratio were used.

Examples 5-6

Lithium batteries were manufactured in the same manner as in Example 4, except that the composite anode active material powders prepared in Examples 2 and 3 were respectively used.

Comparative Examples 3-4

Lithium batteries were manufactured in the same manner as in Example 6, except that the composite anode active material powders prepared in Comparative Examples 1 and 2 were respectively used.

Evaluation Example 1

X-Ray Diffraction (XRD) Test

X-ray diffraction (XRD) test of the composite anode active material powders of Examples 1 to 3 was conducted at a CuK-α X-ray wavelength of 1.541 Å.

Figure 4:
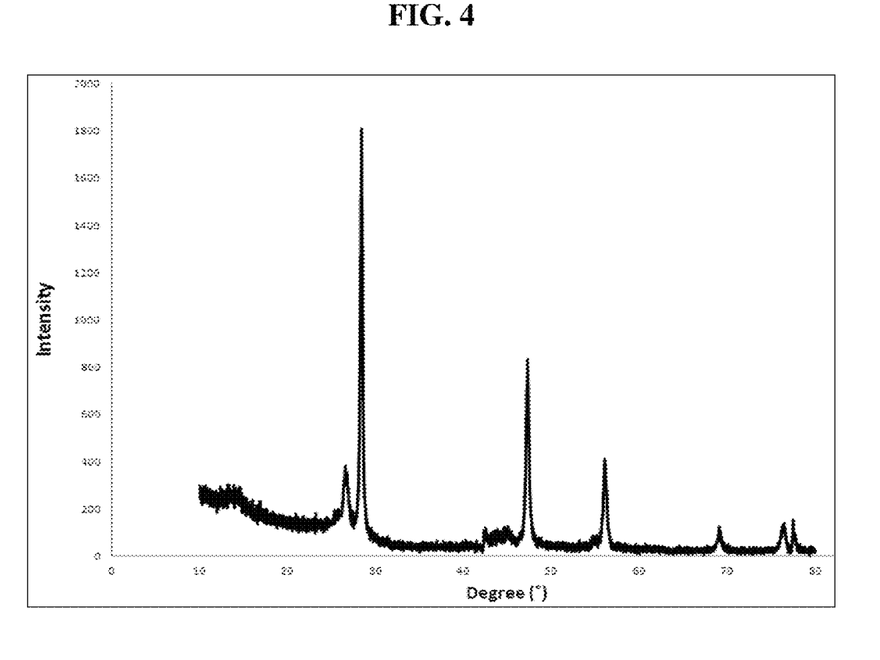
FIG. 4 is an X-ray diffraction (XRD) spectrum of the composite anode active material powder of Example 1.

Referring to FIG. 4, characteristic peaks of the crystalline second carbonaceous material and Si were detected in the composite anode active material powder of Example 1.

A distance between crystal faces calculated from the peaks of the crystalline second carbonaceous material in the composite anode active material particles of Example 1 was about 0.38 nm.

Evaluation Example 2

Tap Density Measurement

Tap densities were measured by tapping a 100 cc mass cylinder filled with 50 cc of each sample powder 500 times (reciprocating by a 3-mm height per second), and then dividing the mass of the sample by volume.

The measured tap densities of the composite anode active material powders of Examples 1 to 3 and Comparative Examples 1 and 2 are shown in Table 1 below.

TABLE 1

|  | Tap density [g/cc] |
|---|---|
| Example 1 | 0.52 |
| Example 2 | 0.49 |
| Example 3 | 0.56 |
| Comparative Example 1 | 0.51 |
| Comparative Example 2 | 0.71 |

Referring to Table 1, the composite anode active materials of Examples 1 to 3 were found to have a tap density of from about 0.4 to about 0.6.

Evaluation Example 3

Nitrogen Adsorption Test

A nitrogen adsorption test of the composite anode active material powders of Examples 1 to 3 and Comparative Examples 1 and 2 was conducted. The results are shown in Table 2 below.

In the nitrogen adsorption test, after nitrogen adsorption to and desorption from each porous composite anode active material, a difference between an adsorbed nitrogen amount and a desorbed nitrogen amount was calculated. A specific surface area and a pore volume of each composite anode active material were calculated using the difference between the adsorbed nitrogen amount and the desorbed nitrogen amount.

TABLE 2

|  | Specific surface area [m²/g] | Total pore volume [cm³/g] |
|---|---|---|
| Example 1 | 600 | 0.55 |
| Example 2 | 560 | 0.52 |
| Example 3 | 550 | 0.52 |
| Comparative Example 1 | 670 | 0.61 |
| Comparative Example 2 | 70 | 0.21 |

Referring to Table 2, the composite anode active materials of Examples 1 to 3 were found to have increased specific surface area and pore volume, as compared with the composite anode active material of Comparative Example 1.

Evaluation Example 4

Evaluation of Charge-Discharge Characteristics

The coin cells of Examples 4-6 and Comparative Examples 3-4 were each charged at a constant current of 0.2 C rate at about 25° C. to a voltage of about 0.01V (with respect to Li), and then charged at a constant voltage of about 0.01 C to a current of about 0.01 C, followed by discharging at a constant current of 0.2 C to a voltage of 1.5V (with respect to Li).

Subsequently, each of the cells was charged at a constant current of 0.5 C rate to a voltage of about 0.01V (with respect to Li), and then charged at a constant voltage of about 0.01V to a current of 0.01 C, followed by discharging at a constant current of 0.5 C to a voltage of about 1.5V (with respect to Li) (formation process).

Each of the lithium batteries after the formation process was charged at a constant current of 1.0 C rate at about 25° C. to a voltage of about 0.01V (with respect to Li), and then charged at a constant voltage of about 0.01V to a current of 0.01 C, followed by discharging at a constant current of about 1.0 C to a voltage of about 1.5V (with respect to Li). This cycle of charging and discharging was repeated 30 times.

Some of the charging/discharging test results are shown in Table 3. Charge/discharge efficiency and capacity retention rate are represented by Equations 1 and 2, respectively:

Charge/discharge efficiency(%)=[Discharge capacity/ Charge capacity]×100    Equation 1

Capacity retention rate[%]=[Discharge capacity at 30$^{th}$ cycle/Discharge capacity at 1st cycle]×100    Equation 2

TABLE 3

|  | Charge/discharge efficiency at 30$^{th}$ cycle [%] | Capacity retention rate at 30$^{th}$ cycle [%] | Discharge capacity at 30$^{th}$ cycle [mAh/g] |
|---|---|---|---|
| Example 4 | 99.8 | 91.8 | 743.5 |
| Example 5 | 99.7 | 89.1 | 721.7 |
| Comparative Example 3 | 99.6 | 85.6 | 693.4 |
| Comparative Example 4 | 99.4 | 82.1 | 665.0 |

Referring to Table 3, the lithium batteries of Examples 4 to 8 were found to have improved initial efficiencies, lifetime characteristics, and discharge capacities, as compared with the lithium batteries of Comparative Examples 3 and 4.

As described above, according to the one or more of the above embodiments of the present disclosure, using a composite anode active material including a composite nanostructure of metal nanowires arranges on a carbon nano-sheet, a lithium battery may have improved characteristics in terms of initial efficiency, discharge capacity, and lifetime characteristics.

In the present disclosure, the terms "Preparation Example," "Example," "Comparative Example" and "Evaluation Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite anode active material comprising porous particles:
    said porous particles each comprising:
    a plurality of composite nanostructures; and
    a first carbonaceous material binding the composite nanostructures,
    wherein the porous particles have pores within the particles, and
    wherein the composite nanostructures comprise a crystalline second carbonaceous material substrate including at least one carbon nano-sheet, and a plurality of metal nanowires arranged at intervals on the crystalline second carbonaceous material substrate.

2. The composite anode active material of claim 1, wherein the plurality of metal nanowires extend away from a surface of the crystalline second carbonaceous material substrate.

3. The composite anode active material of claim 1, wherein the metal nanowires comprises a metal selected from the group consisting of silicon (Si), germanium (Ge), tin (Sn), lead (Pb), aluminum (Al), and an alloy thereof.

4. The composite anode active material of claim 1, wherein the metal nanowires have a diameter of from about 5 nm to about 200 nm.

5. The composite anode active material of claim 1, wherein the porous particles have a pore size from about 50 nm to about 500 nm.

6. The composite anode active material of claim 1, wherein the porous particles have an irregular pore shape.

7. The composite anode active material of claim 1, wherein the porous particle have a tap density of about 1 g/cm³ or less.

8. The composite anode active material of claim 1, wherein the porous particle have a Brunauer-Emmett-Teller (BET) specific surface area of about 100 m²/g to about 650 m²/g.

9. The composite anode active material of claim 1, wherein the porous particle have a pore volume of about 0.3 cm³/g to about 0.6 cm³/g.

10. The composite anode active material of claim 1, wherein the porous particle have a spherical or elliptical shape having an aspect ratio of about 3 or less.

11. The composite anode active material of claim 1, wherein an amount of the composite nanostructures is from about zero to about 86 wt % based on a total weight of the particle.

12. The composite anode active material of claim 1, wherein the crystalline second carbonaceous material has a structure in which n polycyclic carbon nano-sheets are stacked upon one another substantially perpendicular with respect to a first plane, wherein each of the polycyclic carbon nano-sheets includes six-member carbocyclic rings linked to each other, the six-member carbocyclic rings being fused to one another and arranged on the first plane, and n is an integer from 2 to 250.

13. The composite anode active material of claim 1, wherein a crystal lattice plane distance ($d_{002}$) of the second carbonaceous material is from about 0.330 nm to about 0.400 nm.

14. The composite anode active material of claim 1, wherein the first carbonaceous material comprises amorphous carbon.

15. The composite anode active material of claim 1, wherein the first carbonaceous material is a calcined product of a carbon precursor.

16. An anode comprising: a current collector; and the composite anode active material of claim 1.

17. A lithium battery comprising: a cathode; and the anode of claim 16.

* * * * *